United States Patent [19]

Hsu

[11] 4,222,471
[45] Sep. 16, 1980

[54] CLUTCH AND BRAKE ARRANGEMENTS FOR A MOTOR

[76] Inventor: Yung-San Hsu, No. 132, Ho Ping Rd. Hsi Men Li, Tao Yuan City, Taiwan

[21] Appl. No.: 904,815

[22] Filed: May 11, 1978

[51] Int. Cl.[2] .............................................. F16D 67/06
[52] U.S. Cl. .............................. 192/18 B; 192/84 AB
[58] Field of Search ............... 192/18 B, 12 D, 84 AB

[56] References Cited

U.S. PATENT DOCUMENTS

| | | | |
|---|---|---|---|
| 1,229,984 | 6/1917 | Libbey | 192/18 B |
| 2,470,103 | 5/1949 | Lochman | 192/18 B |
| 3,322,249 | 5/1967 | Klinkenberg | 192/18 B |

FOREIGN PATENT DOCUMENTS 459155  8/1949  Canada .................................. 192/18 B
2601121  7/1976  Fed. Rep. of Germany ..... 192/84 AB

*Primary Examiner*—George H. Krizmanich
*Attorney, Agent, or Firm*—Shoemaker and Mattare, Ltd.

[57] ABSTRACT

This invention relates to a clutch and brake device, more particularly to such a device that the coupling winding fixed onto the supporting means extends within the rim groove of the flywheel-and-clutch member, having a clearance in between the coupling winding and the flywheel-and-clutch member, and two sets of brake winding are installed in the brake member; having the features that by selecting either the coupling winding or the brake winding to be energized either the clutch disc or the brake disc is moved toward the coupling or the braking position to make friction engagement with the clutch member or the brake member to drive or to brake.

1 Claim, 2 Drawing Figures

CLUTCH AND BRAKE ARRANGEMENTS FOR A MOTOR

BACKGROUND OF THIS INVENTION

Since the coupling windings of conventional clutch and brake device are installed on the outer side of clutch disc and brake disc respectively, the directions of the magnetic forces generated by the coupling windings and the brake windings are the same as that of the movement of the clutch disc or the brake disc. Meantime because of small magnetically effective area, the effective pulling torque is small and thus the accuracy of transmission and braking is reduced. Furthermore, because the coupling windings and brake windings are installed on the outer side, the construction is complicated and the fabrication and the assembling are difficult.

Another type of conventional device is known as such that the coupling winding is installed in the clutch member and rotates therewith. It is also known as a prior art that the brake winding is installed in the brake member. However, since the coupling winding rotates with the clutch member, the wiring thereof is very difficult and requires brushes which are subject to break down. Moreover, since the device having the brake winding installed in the brake member has only one set of winding, its magnetically effective area is small and the pulling torque is not sufficient to give effectiveness to the accuracy of braking.

The main object of this invention is to improve the aforesaid drawbacks of conventional clutch and brake devices and to provide a novel device in which the transmission and the braking with larger torque are obtained with the magnetic flux passing through the whole clutch disc or brake disc to increase the effective area for magnetic effect whereby the pulling torque is increased and thus the transmission torque and the braking torque are increased consequently.

Another object of this invention is to provide such a clutch and brake device that the winding is split in two sets of winding which are connected in the opposite directions to minimize the inductance and the reactive electromotive force accordingly. The response is quick and the operation is accurate, therefore the transmission function of the clutch is fast and the braking function of the brake is accurate.

Still another object of this invention is to provide a clutch and brake device of simple construction that will not break down and also is easy to fabricate and to assemble.

Since the coupling winding of this invention fixed onto the supporting means extends within the flywheel-and-clutch member and is segregated from the flywheel-and-clutch member by a non magnetically inductive material, therefore, the magnetic flux passes through the whole clutch disc with which the effective area of magnetic effect is increased and the pulling torque is increased accordingly. The construction of this invention is simplified, not subject to break down, and easy to fabricate and to assemble.

This invention will be fully understood from the following description of the embodiments, taken in conjunction with the accompanying drawing, in which.

DETAILED DESCRIPTION OF THIS INVENTION

Figure 1:
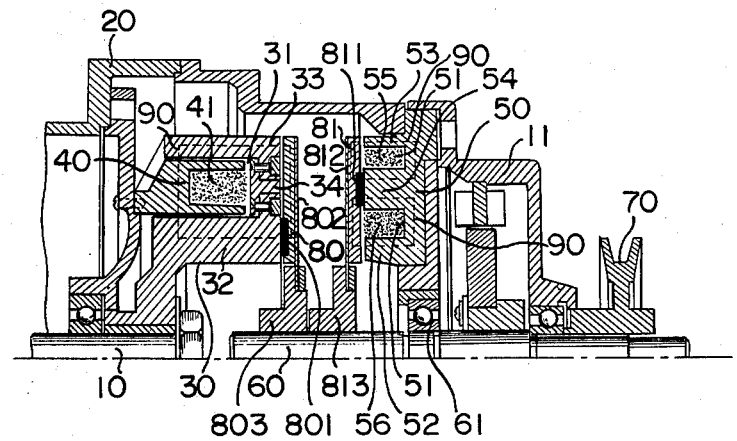
FIG. 1 is a fragmentary vertical sectional view illustrating a first embodiment of this invention.

Referring to FIG. 1, a motor shaft 10 is installed through the bearing of a supporting means 20. A flywheel-and-clutch member 30 having a rim groove 31 which is constituted by a wheel hub 32 and a peripheral ring 33. A non magnetically inductive member 34 of such material as aluminum alloy, copper or the like is fixed at the bottom of said rim groove 31 by virtue of rivets. Said clutch member 30 is split into inner part and outer part in order to increase the magnetic field resistance to avoid the short circuit of magnetic flux through the bottom of said rim groove 31. An iron core 40 around the circular depression of which a multiple coupling winding 41 is wound is fastened stationarily onto said supporting means 20 and is in mesh with said rim groove 31 in a manner in which in between said iron core 40 and said wheel hub 32, said iron core 40 and said peripheral ring 33, a clearance is formed.

A brake member 50 is mounted on a housing 11, having two ring shaped grooves 51—51, a conical hub flange 52, a peripheral ring 53 and a center flange 54. In each said ring shaped grooves 51, two multiple brake winding 55 and 56 are respectively wound. Said two multiples brake winding 55 and 56 are wired in opposite direction to each other so as to minimize the inductance and the reactive electromotive force accordingly.

A transmission shaft 60 is installed in a bearing 61 which is mounted in the cylindrical interior of said housing 11 approximately in the same axis as said motor shaft 10. Said transmission shaft 60 has a belt pulley 70 on its end which drives the other pulley on the other drive shaft (not shown in the drawing) through a belt.

A clutch disc 80 and a brake disc 81 are respectively mounted on mounting bases 803 and 813, the former by virtue of an elastic material 802, the latter by virtue of an elastic material 812. Said mounting bases 803 and 813 are fixed on said transmission shaft 60 in such manner that a clearance between said clutch disc 80 and said flywheel-and-clutch member 30 and a clearance between said brake disc 81 and said brake member 50 are provided so that said clutch disc 80 and brake disc 81 can be pulled either toward said flywheel-and-clutch member 30 or toward said brake member 50. Said clutch disc 80 and brake disc 81 are respectively provided with lining 801 and 811 fixed thereupon to perform friction contact with said flywheel-and-clutch member 30 and said brake member 50 respectively.

When said coupling winding 41 is energized, the magnetic flux is generated as shown by the dotted line 90 passing through said peripheral ring 33 of said flywheel-and-clutch member 30, said clutch disc 80, said wheel hub 32 of said flywheel-and-clutch member 30 and said iron core 40 forming a magnetic circuit. Being pulled by the magnetic force, said clutch disc 80 thus moves axially toward left causing said lining 801 in connection with said clutch member 30 to perform frictional engagement therewith, thus the rotation of said motor shaft 10 and said clutch member 30 is transmitted to said transmission shaft 60 through said clutch disc 80.

As indicated in FIG. 1, when said two sets of brake winding 55, 56 are energized, two magnetic fluxes are generated, in which the one generated by said brake winding 55 passes through said peripheral ring 53 of said brake member 50, said brake member 50, said center flange 54 of said brake member 50 and the upper half of said brake disc 81 to form a magnetic circuit, while the one generated by said winding 56 passes through said center flange 54 of said brake member 50, the lower half of said brake disc 81, said conical hub flange 52 of said brake member 50 and said brake member 50 to form another magnetic circuit. The magnetic force pulls said brake disc 81 to move toward right axially, forcing said lining 811 of said brake disc 81 against said brake member 50 to perform frictional engagement, with which said transmission shaft 60 is braked and the rotation is stopped.

Figure 2:
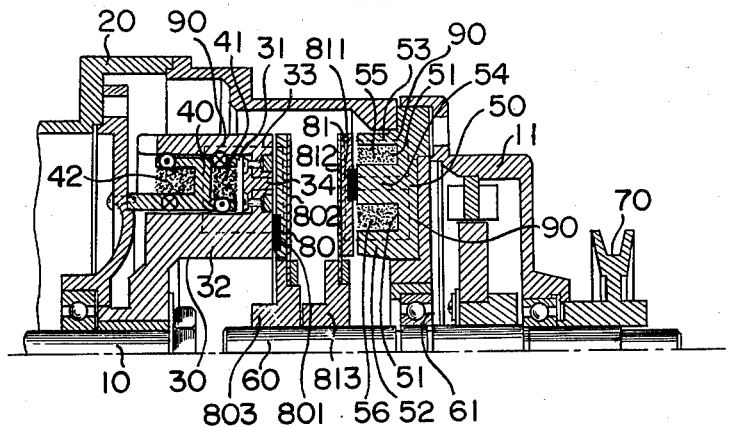
FIG. 2 is a fragmentary vertical sectional view illustrating a second embodiment of this invention.

FIG. 2 shows a second embodiment of this invention in which the coupling winding installed in the flywheel-and-clutch member 30 is divided into two multiples coupling windings 41, 42, which are wired with directions opposite to each other so as to minimize the inductance and the reactive electromotive force accordingly.

What I claim is:

1. A clutch and brake device for controlling motion of a transmission shaft, comprising:
   a motor shaft;
   a transmission shaft;
   a supporting means connected to said motor shaft;
   a flywheel-and-clutch member, having the provision of a rim groove;
   an iron core having the provision of a circular depression defined thereon, being fixed onto said supporting means and extending within said rim groove of said flywheel-and-clutch member with a clearance defined between said rim groove and said flywheel-and-clutch member;
   a pair of coupling windings each of which is wired within said circular depression of said iron core, said windings being wound in directions opposite to each other so that current passing through one of the windings is opposite to current passing through the other one of said pair of windings, said pair of windings being positioned in end-to-end alignment with each other, both windings being spaced from each other and in spaced parallelism with the transmission shaft so that magnetic flux generated on said transmission shaft by one of said windings is offset by magnetic flux generated on said transmission shaft by the other one of said pair of windings to minimize net inductance on said transmission shaft;
   magnetic means located between said pair of coupling windings so that magnetic fluxes generated by said coupling windings are added together in said magnetic means between said coupling windings;
   a non-magnetic material fixed at the bottom of said rim groove of said flywheel-and-clutch member;
   a brake member, having the provision of a plurality of ring shaped grooves;
   a plurality of brake windings each of which is wired respectively in one of said ring shaped grooves in opposite directions to each other to minimize the overall inductance and the overall reactive electromotive force, said brake windings being in spaced parallelism with each other and with the transmission shaft;
   a clutch disc connected to said transmission shaft and located adjacent said set of coupling windings; and
   a brake disc connected to said transmission shaft and located adjacent said brake windings.

* * * * *